Figure 1:
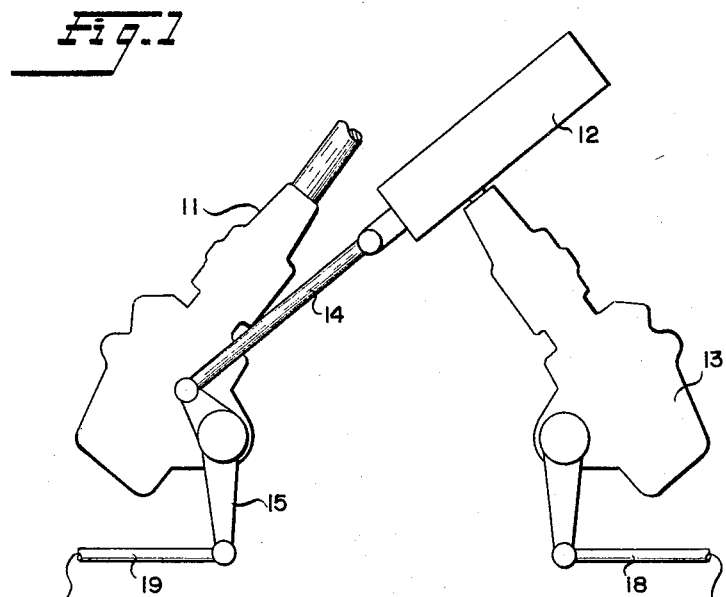

Oct. 18, 1966    M. LINSAY    3,279,813
SELECTIVE FOUR-WHEEL STEERING MECHANISM
Filed Nov. 16, 1964    4 Sheets-Sheet 1

To Steering Knuckle On The
Fulltime Controlled Steerable Axle

To Steering Knuckle
On The Selectively
Controlled Steerable
Axle

INVENTOR
Michael Linsay

BY *Littlepage & [signature]*

ATTORNEYS

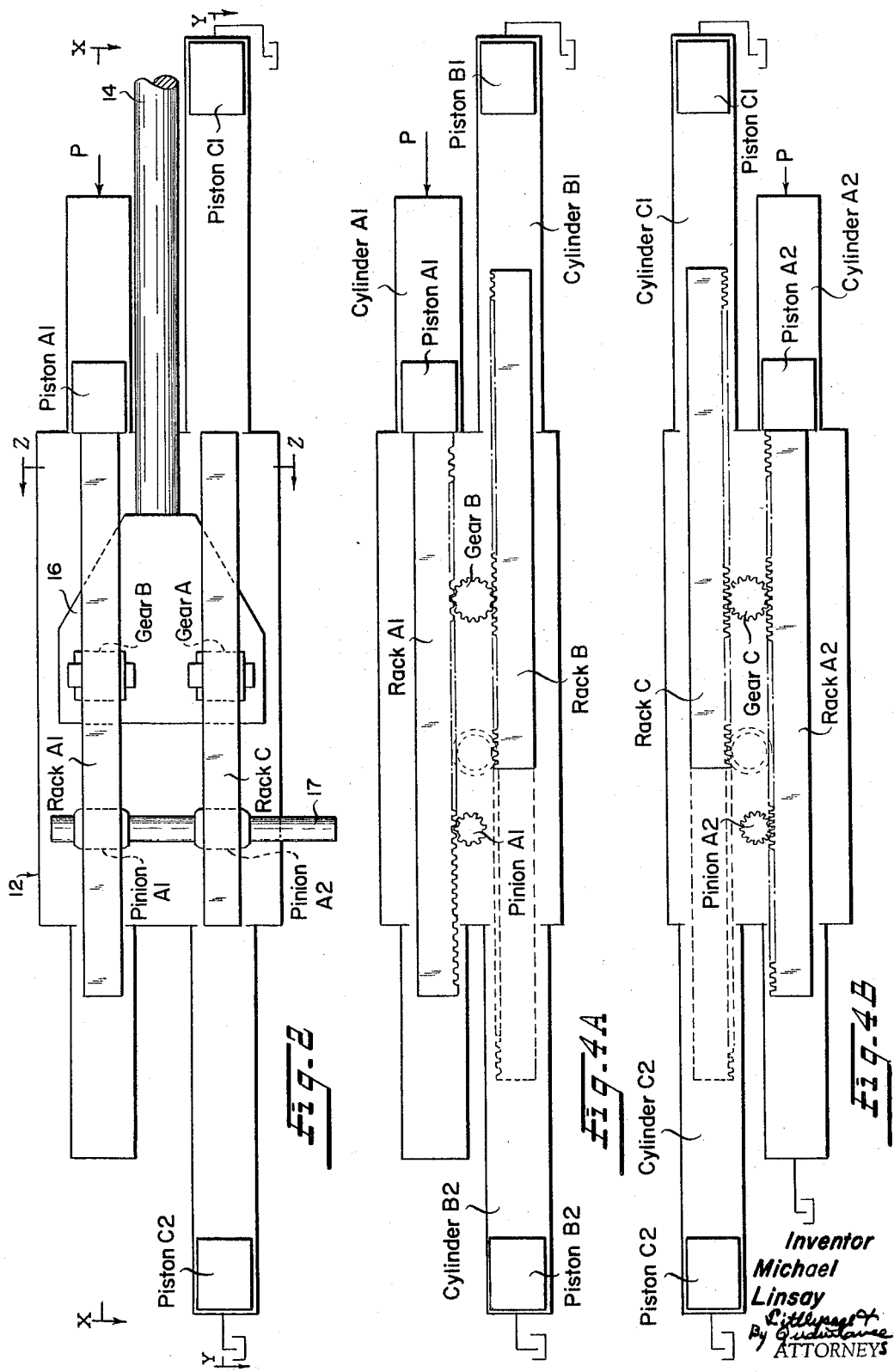

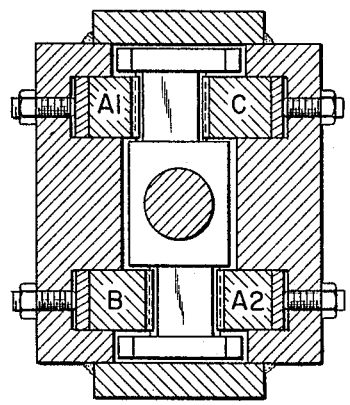
Fig. 3
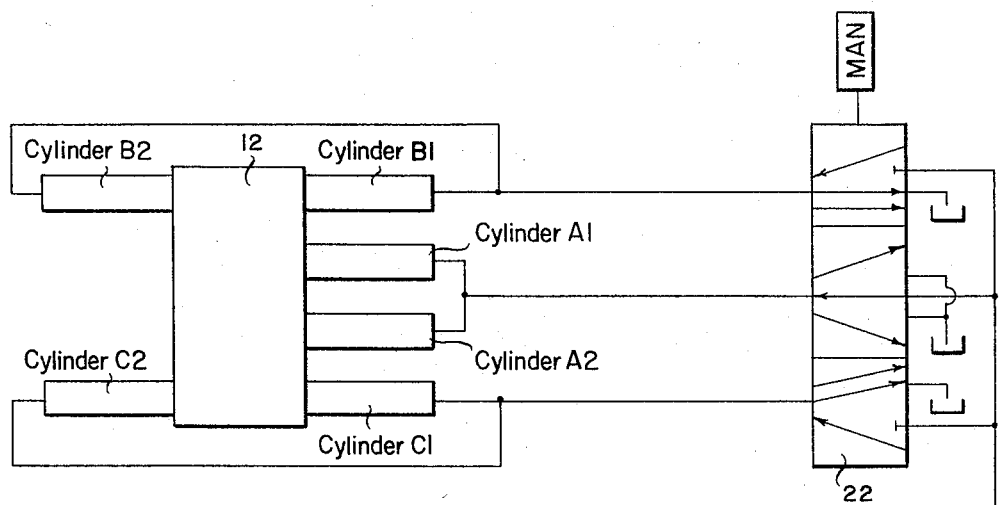
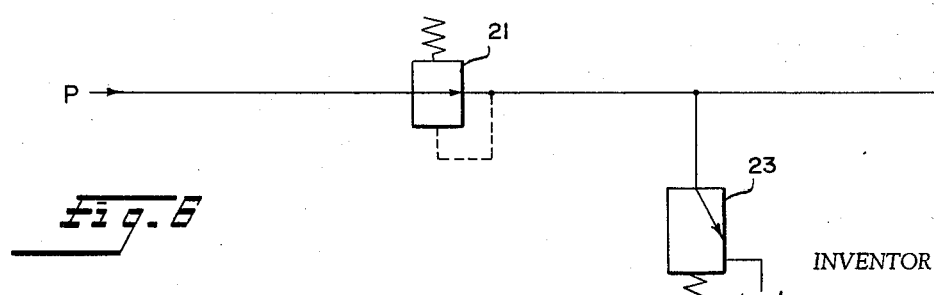
Fig. 6

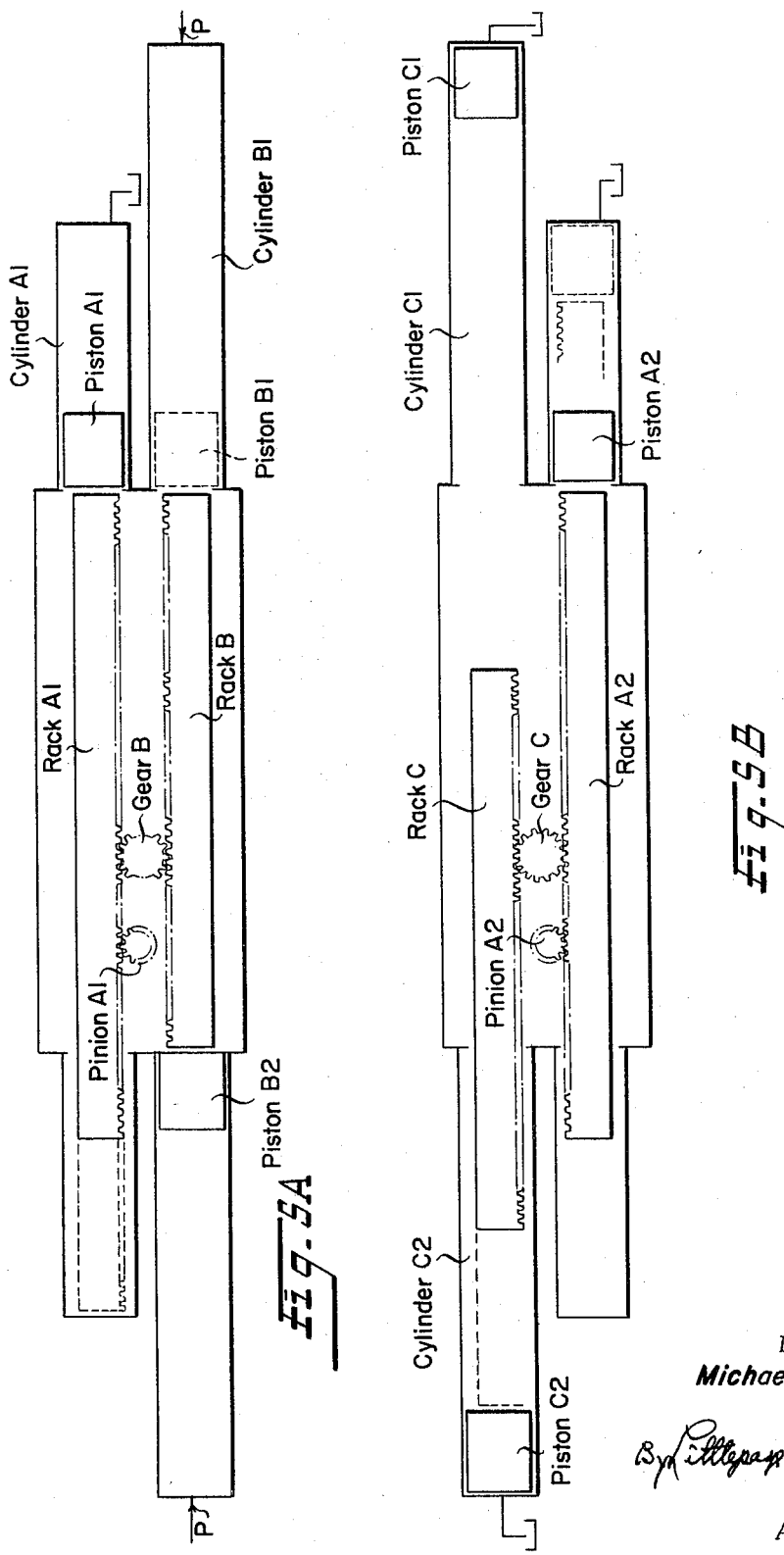

United States Patent Office 3,279,813
Patented Oct. 18, 1966

3,279,813
SELECTIVE FOUR-WHEEL STEERING
MECHANISM
Michael Linsay, South Euclid, Ohio, assignor to C & M Industrial Associates, Inc., Washington, D.C., a corporation of Pennsylvania
Filed Nov. 16, 1964, Ser. No. 411,489
12 Claims. (Cl. 280—91)

This invention relates to improvements in selective four-wheel steering control mechanisms and more particularly to a four-wheel steering mechanism that will selectively, automatically synchronize the front and back wheels when four-wheel steering is desired or automatically straighten the back wheels when two wheel steering is desired.

It is desirable to use steering mechanisms on specialized vehicles, such as trucks, tractors, cranes, etc., that will provide quick manueverability in making sharp turns and crablike movements for restricted areas and still meet the requirements for normal highway driving.

The purpose of this invention is to provide an improved steering control means for both axles of a four-wheel vehicle which will allow fulltime control of one axle and more effective, selective control of the second axle. Using a selective control lever attached to the mechanism of this invention the driver may place the selectively controlled axle in a "cramp," or "crab" or a "two-wheel" position.

The mechanism of this invention has the following advantages over the prior art: (1) it eliminates periods of no control over the wheels; (2) it returns the selectively controlled wheels to the "straight-ahead" position from any position they are when the control lever is placed in the "two-wheel" position and remain there without any drift; (3) when the control lever is placed in either "cramp" or "crab" position, the selectively controlled wheels are automatically synchronized at the same or correspondent angle as the fully controlled wheels. The selection of the "cramp" or "crab" position and automatic synchronization of the selectively controlled wheels in the direction desired is accomplished without a corresponding change or activation of the fully controlled wheels after the control lever has been moved; (4) when under four wheel control, the wheels of the selectively controlled axle automatically follows the fulltime steered axle without any drift until the control lever is returned to the "two wheel" steering position.

It is accordingly among the objects of this invention to provide an improved selectively controlled four-wheel steering mechanism.

Another important object of the present invention is to provide a four-wheel steering mechanism that is always under the driver's complete control.

It is another important object of this invention to provide a selective four-wheel steering mechanism that will automatically synchronize the position of the controlled and the selectively controlled wheels in either a "crab" or a "cramp" position.

It is another important object of this invention to provide a selective four-wheel steering mechanism that will automatically return the selectively controlled wheels to the "straight-ahead" position when two wheel steering is desired without moving the fully controlled wheels.

Other objects and advantages of this invention will be apparent from the accompanying drawings and description and the essential features will be set forth in the appended claims.

Figure 9:
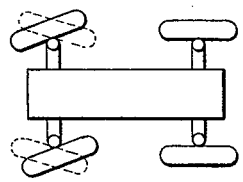
Figure 7:
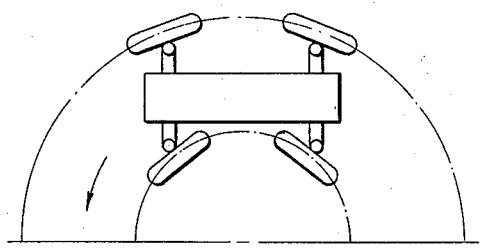
Figure 8:
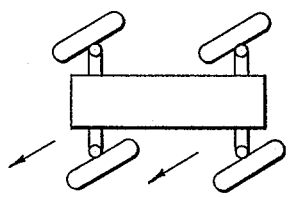

In the drawings:

FIGURE 1 is a side view showing the steering assembly;

FIGURE 2 is a sectional view of the selector box;
FIGURE 3 is a sectional view taken on line Z—Z of FIGURE 2 which shows the relative position of the racks within the selection box;
FIGURE 4A is a section of the selector box taken on line X—X of FIGURE 2 when the selector box is set for two wheel steering;
FIGURE 4B is a section of the selector box taken on line Y—Y of FIGURE 2 when the selector box is set for two wheel steering;
FIGURE 5A is a section of the selector box taken on line X—X when the steering is changed from two wheel to four-wheel steering;
FIGURE 5B is a section of the selector box taken on line Y—Y when the steering is changed from two wheel to four-wheel steering;
FIGURE 6 is a schematic diagram showing one preferred modification of the hydraulic system controlling the selector box;
FIGURE 7 is a diagrammatic view of vehicle wheels turned in a "crab" position;
FIGURE 8 is a diagrammatic view of vehicle wheels turned in a "cramp" position; and
FIGURE 9 is a diagrammatic view of vehicle wheels in the "two-wheel" position.

For the purpose of describing this invention the front axle will be the fulltime controlled steerable axle, and the rear axle will be the axle upon which the selective steering mechanism of this invention is to operate. It should be clearly understood that on other vehicles this arrangement could be reversed, i.e., the rear axle would be the controlled axle and the front would be the follow up axle.

The master steering gear 11, shown in FIGURE 1, may be any standard steering gear which is controlled by a standard steering wheel in the usual manner. The slave steering gear 13 may preferably be a standard power steering gear. The selector box 12 is the mechanism that drives and controls the slave steering gear.

The control mechanism may include a lever (not shown) with a three-position indicator.

With the front wheels at any desired angle within their steerable range, the steering control lever may be moved from any one of the three positions to another, e.g., from "two wheel" to four-wheel "crab" or four-wheel "cramp" position. Without applying further turning motion to the steering wheel, the selector box 12 will make the rear wheels automatically position themselves to a corresponding angle with the front wheels and from then on automatically follow-up all of the motion of the front wheels until the control lever is returned to the "straight-ahead" or "two-wheel" position.

Upon activation by the operator to "two wheel" position, the selector box 12 causes the rear wheels to return to the straight ahead position no matter where the front wheels are situated. In going from one position to another, such as "crab" to "cramp," the operator moves the control lever through the "two-wheel" position causing the rear wheels to move from the angle of the given position through a neutral or "zero" position to a corresponding angle in the opposite direction and from that time on the rear wheels will be in a corresponding position to follow-up the front wheels.

For example, if the operator turns the front wheels 15° to the right while the control is in "two-wheel" position, and then selects a "cramp" steer, the rear wheels automatically will go to 15° to the left. (See FIGURE 7.) If the operator then, without changing the front wheels, moves the control lever to "crab" steer position passing through the "two-wheel" position, the rear wheels will go to straight ahead and automatically keep on going until they have gone to the corresponding angle of 15° to the right, such that the wheels are parallel with the front wheels causing the truck to crab sidewards in a sideward direction. (See FIGURE 8.)

A detailed description of the selector box 12 and how it brings about these movements follows: FIGURE 1 shows the master and slave steering gears 11 and 13 with the selector box 12 driving the slave gear 13. An input shaft 14 from the master steering gear goes into the selector box 12. Input shaft 14 is always synchronized to the position of the front wheels because of a mechanical drag link 19 which is connected between the pitman arm 15 and the steering knuckle of the wheel end of the front axle (not shown). Such links are well known in the art.

The structure and operation of selector box 12 is shown in FIGURES 2 to 5B. The selector box contains a series of racks and pinion gears that selectively control the movement of slave gear 13. Gear carrier 16 attached to the input rod carries two free floating pinion gears B and C which intermesh and control the movement of corresponding racks B and C. Gear carrier 16 and gears B and C function so as to synchronize the movement of input shaft 14 and a series of racks and gears that control the movement of output shaft 17. This series of racks and gears consists of a first pair of prallel racks A1 and B, and a second pair of parallel racks C and A2. Gear B when moved pushes racks A1 and B in opposite directions; gear C when moved pushes rack C and A2 in opposite directions. Pinion gears A1 and A2 are attached to and control the movement of output shaft 17, shaft 17 in turn controls the movement of the slave steering gear 13. Rack A1, the upper rack in the first set of parallel racks, controls the movement of pinion gear A1, and rack A2, the lower rack in the second set of parallel racks, controls the movement of pinion gear A2. When both racks A1 and A2 are locked in place, pinions A1 and A2, output shaft 17 and slave steering gear 13 are locked in place.

The preferred manner of selectively activating the racks and pinion gears is a series of cylinders and floating pistons A1 to C2 which are arranged in pairs, A1–A2, B1–B2, and C1–C2 which can be selectively pressurized to restrict the movement of the corresponding racks A1 and A2, B C or depressurized to permit movement of these corresponding racks.

FIGURE 3 shows the relative position of racks A1, A2, B and C in the selector box 12.

When the control lever is set for two wheel steerage the relative positon of the gears and racks in selector box 12 is shown in FIGURES 4A and 4B. Cylinders A1 and A2 are pressurized to lock pistons A1 and A2 in place. This in turn locks racks A1 and A2, pinions A1 and A2, output shaft 17 and the slave steering gear. In this position, the zero position, the back wheels remain straight even when the front wheels turn. Turning the front wheels will move the input rod 14 causing gears B and C and racks B and C to free wheel without doing any work. It should be noted that racks B and C do not contact pinions A1 and A2, so locking pinions A1 and A2 do not lock racks B and C or gears B and C. The dotted lines in FIGURES 4A and 4B illustrate how gears B and C and racks B and C move when the input rod 14 is moved to the left.

FIGURES 5A and 5B illustrate the position of the racks and gears in the selector box when the control lever is moved from two wheel to four wheel steering. Moving the control lever to "cramp" position depressurizes cylinders A1 and A2, thereby releasing pistons A1 and A2 and pressurizing cylinders B1 and B2 to lock pistons B1 and B2 in place. The fluid in cylinders A1 and A2 could be released by connecting the cylinders to a fluid collecting tank or in some similar known manner. Piston B1 seats first because it meets no resistance. Piston B2 moves rack B locking it in place against piston B1, rotates the output shaft 17 through gear B (which is held in place by the pitman arm 4 of the master steering gear), and moves rack A1 and pinion A1. The rotation of output shaft 17 is proportional to or synchronized with the position of the input rod 14 from its central position. The rotation of output shaft 17, through pinion A2 and rack A2 retracts piston A2 (dotted lines) and rack C free wheels (dotted lines).

The dotted lines in FIGURES 5A and 5B could also illustrate the movements of the racks and gears in the selector box during four wheel steering. The pistons B1 and B2 in pressurized cylinders B1 and B2 lock rack B in position. Moving the steering wheel, moves input rod 14 (movement not shown) which in turn causes gear B to roll on rack B and actuate rack A1. Rack A1 rotates the output shaft 17 through pinion A1, which in turn free wheels rack 2A through pinion A2 and rack C through rack A2 and gear C.

When the selector box is set for two wheel steering (FIGURE 9), the racks A1 and A2 are locked to hold the output shaft 17 in "zero" position and the drag link 18 attached to the rear wheels is set or adjusted so that the rear wheels are in a straight ahead position. Every time output shaft 17 returns to "zero" position the rear wheels return to a straight ahead position.

It is readily seen that when rack B is locked in place the output shaft 17 will cause the slave steering gear to turn the rear wheels to either a "cramp" or "crab" position. The type of turn would be determined by the method of linking the drag linkage to the rear axle. The method of making such linkages is optional and well known in the art. For this disclosure we have assumed that the linkage used caused a cramp movement (FIGURE 7) of the back wheels when rack B was locked.

The selector box 12 works in a similar manner when cylinders C1 and C2 are pressurized, instead of cylinders B1 and B2, locking rack C in place. When rack C is locked, however, the same corresponding steering movements of the steering wheel would rotate the output shaft 17 in the opposite direction and move the rear wheels in the opposite direction to cause, in this case, a crab movement (FIGURE 8) of the back wheels.

It should be readily apparent that the racks, pinion gears and cylinders may be interchanged in various combinations to obtain the same results since only the relative movement between these members is important. The above discussion and drawing merely illustrate one preferred embodiment of this invention.

FIGURE 6 illustrates one preferred means of controlling the selector box 12. The hydraulic system which is partially shown may be actuated by the control lever. Preferably the hydraulic system has a standard hydraulic fluid tank and pump (not shown), a standard pressure regulating reducing valve 21, a directional valve 22, for cylinders A1 and A2, B1 and B2, and C1 and C2 and a standard pressure relief valve 23.

Although a hydraulic system containing floating pistons is most practical for selectively locking racks A1 and A2, B and C, other mechanical means could be employed to lock and release the desired rack or racks.

By using the selective rack and gear four wheel steering mechanism of this invention, rather than a heavy locomotive reversing linkage such as the Stevenson linkage, the steering forces required are much smaller and a superior vehicle control is obtained. In addition to greater efficiency the mechanism of this invention is smaller and more economical than most, if not all, prior art four-wheel steering devices. Furthermore, the mechanism of this invention is the only known four-wheel steering device that maintains fulltime control over the front wheels and maintains synchronized positions and movements without any drift of the front and back wheels during four wheel and two wheel control.

In the claims that follow the terms "cramp" and "crab" are used in a relative manner to indicate that "cramp" turns the output shaft one way and "crab" turns the output shaft the opposite way for a given movement of the master steering gear. In the same manner the terms "upper" and "lower," and "parallel" are used to indicate that the corresponding racks are in different relative positions; this relative position could be reversed or it could be a left-right-position instead of an upper-lower position, and the parallel plane need not be vertical or an exact plane.

What is claimed is:

1. A selector box for selectively engaging a slave steering gear comprising an input shaft, said input shaft having means to synchronize the movement of said input shaft with the movement of a master steering gear; an output shaft adapted to control a slave steering gear; rack and pinion means arranged to control the movement of said output shaft; means attached to said input shaft to synchronize the movement of said input shaft and said rack and pinion means; and means to selectively activate said rack and pinion means so that said output shaft will selectively turn said slave steering gear to a crab, a cramp, or a straight ahead position.

2. The selector box of claim 1, wherein said means attached to said input shaft to synchronize the movement of said input shaft and said rack and pinion means comprises a gear carrier attached to the end of said input shaft within said selector box, said gear carrier having two floating pinion gears attached in a manner that activates the racks of said rack and pinion means when said gear carrier is moved.

3. The selector box of claim 1, wherein said rack and pinion means comprises a first and second pair of parallel racks, a first and second pinion gear attached to the output shaft to control the movement of said output shaft, said first pair of parallel racks having the upper racks adapted to control the movement of said first pinion gear on said output shaft and said second pair of parallel racks having the lower rack adapted to control the movement of said second pinion gear on said output shaft.

4. The selector box of claim 3, wherein said means attached to said input shaft to synchronize the movement of said input shaft and said rack and pinion means is a gear carrier attached to the end of said input shaft within said selector box, said gear carrier having a first and second floating pinion gear attached to said gear carrier, said first gear on said carrier being positioned between said first pair of parallel racks so that when said first gear turns each of said first pair of parallel racks will be pushed in opposite directions, and said second gear on said carrier being positioned between said second pair of parallel racks so that when said second gear turns each of said second pair of parallel racks will be pushed in opposite directions.

5. The selector box of claim 4, wherein said means to selectively activate said rack and pinion means is a series of three pairs of hydraulic cylinders and corresponding pistons arranged so that only one pair of pistons can be activated at a time in one of the following manners: (1) a first pair of cylinders and pistons arranged to lock in place each of said racks in said first and second pair of parallel racks that control the movement of said first and second pinion gear attached to said output shaft thereby locking said output shaft in straight ahead position; (2) a second pair of cylinders and pistons arranged to lock in place the lower rack in said first pair of parallel racks which does not contact said first pinion gear attached to said output shaft thereby activating said output shaft in a cramp manner; (3) a third pair of cylinders and pistons arranged to lock in place the upper rack in said second pair of parallel racks which does not contact said second position gear attached to said output shaft thereby activating said output shaft in a crab manner.

6. The selector box of claim 5, wherein said corresponding pistons are floating pistons.

7. A four wheel selective steering mechanism comprising a first set of wheels; a master steering gear that continuously controls said first set of wheels; a selector box; an input rod to said selector box; means to synchronize the movement of said input rod with the movement of said master steering gear and said first set of wheels; a second set of wheels; a slave steering gear that controls the movement of said second set of wheels; an output shaft from said selector box that controls the movement of said slave steering gear; rack and pinion means within said selector box to control the movement of said output shaft; means to synchronize the movement of said input shaft and said rack and pinion means; actuating means to selectively synchronize the movement of said racks, pinions and output shaft in a manner that selectively moves said slave steering gear so that said second set of wheels are turned to a crab, a cramp or a straight ahead position.

8. The four wheel selective steering mechanism of claim 7, wherein said means to synchronize the movement of said input shaft and said rack and pinion means comprises a gear carrier attached to the end of said input shaft within said selector box, said gear carrier having two floating pinion gears attached to said gear carrier in a manner that activates the racks of said rack and pinion means when said gear carrier is moved.

9. The four wheel selective steering mechanism of claim 7, wherein said rack and pinion means comprises a first and second pair of parallel racks, a first and second pinion gear attached to said output shaft adapted to control the movement of said output shaft, said first pair of parallel racks having the upper rack adapted to control the movement of said first pinion gear on said output shaft, and said second pair of parallel racks having the lower rack adapted to control the movement of said second pinion gear on said output shaft.

10. The four wheel selective steering mechanism of claim 9, wherein said means to synchronize the movement of said input shaft and said rack and pinion means is a gear carrier attached to the end of said input shaft within said selector box, said gear carrier having a first and second floating pinion gear, said first gear on said carrier being positioned between said first pair of parallel racks so that when said first gear turns each of said first pair of parallel racks will be pushed in opposite directions, and said second gear on said carrier being positioned between said second pair of parallel racks so that when said second gear turns each of said second pair of parallel racks will be pushed in opposite directions.

11. The four wheel selective steering mechanism of claim 10, wherein said means to selectively activate said racks and pinion means is a series of three pairs of hydraulic cylinders and corresponding pistons arranged so that only one pair of pistons can be activated at a time in one of the following manners; (1) a first pair of cylinders and pistons arranged to lock in place each of said racks in said first and second pair of parallel racks that control the movement of said first and second pinion gear attached to said output shaft in straight ahead position; (2) a second pair of cylinders arranged to lock in place the lower rack in said first pair of parallel racks which does not contact said first pinion gear attached to said output shaft thereby activating said output shaft in a cramp manner; (3) a third pair of cylinders and pistons arranged to lock in place the upper rack in said second pair of parallel racks which does not contact said second pinion gear attached to said output shaft thereby activating said output shaft in a crab manner.

12. The four wheel selective steering mechanism of claim 11, wherein said corresponding pistons are floating pistons.

References Cited by the Examiner

UNITED STATES PATENTS 3,140,101   4/1964   Sheppard _____ 280—91
3,197,229   7/1965   Houlton _____ 280—91

KENNETH H. BETTS, *Primary Examiner.*